April 30, 1946.  R. W. MILLER ET AL  2,399,282
METHOD OF PEELING POTATOES
Filed Feb. 9, 1944
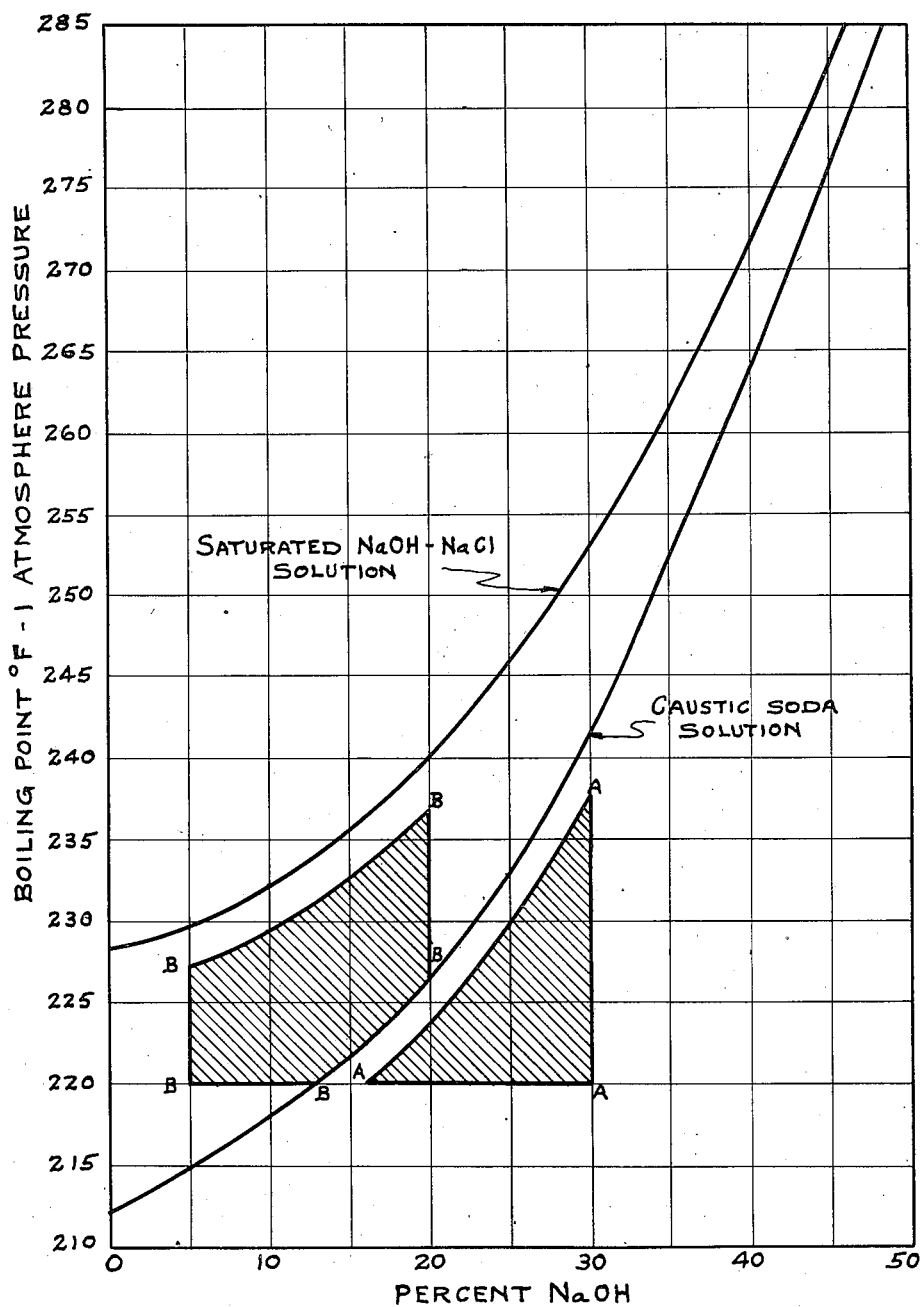
INVENTORS
RALPH W. MILLER
OSCEOLA W. ANDREWS
BY Donald J Haefele
ATTY.

Patented Apr. 30, 1946

2,399,282

UNITED STATES PATENT OFFICE 2,399,282

METHOD OF PEELING POTATOES

Ralph W. Miller and Osceola W. Andrews, Barberton, Ohio, assignors to Pittsburgh Plate Glass Company, Pittsburgh, Pa., a corporation of Pennsylvania Application February 9, 1944, Serial No. 521,645

2 Claims. (Cl. 146—235)

This invention relates to an improvement in the art of removing inedible surface parts of vegetables and is particularly adapted for treating potatoes.

The use of caustic alkali hydroxides for the purpose of removing the exterior portions of potatoes is well known and has experienced a wide expansion due to the fact that less potato is wasted than by abrasion peeling methods. The usual loss in weight during the abrasion peeling operation is 20 to 30 percent while caustic treatment usually requires the removal of only 5 to 10 percent of the potato. In treating potatoes with caustic a short immersion time is preferred, at temperatures close to the boiling point. This causes a degradation of the surface layers and the loosening of it from the sub-surface or cambium layer. The caustic will also attack and discolor the interior of the potato and accordingly, it should remain in contact with the caustic solution only long enough to remove the skin. Deep penetration should be avoided to minimize potato loss. Potatoes which have been lye treated are discolored on the surface and the same discoloration extends to the depth to which the caustic soda has penetrated. Upon subsequent washing, all of the discolored portion is readily removed leaving the potato without any deleterious effect of the caustic treatment.

In determining whether the caustic treatment is more economical than abrasion peeling methods careful consideration must be given to the cost of the sodium hydroxide which frequently represents an important element of the peeling costs. Accordingly, it is an object of this invention to provide an improved method of peeling potatoes which consumes less caustic soda than prior methods.

We have discovered that in prior caustic peeling operations a very substantial proportion of the caustic soda is lost by adherence to the surface of the potato or by absorption in the discolored surface layer. This is particularly true when "old potatoes" or varieties of potatoes having rough exteriors or exceptionally thick skins are being treated. Accordingly, only a relatively small proportion of the consumed caustic is actually utilized in the degradation of the surface layers, while the balance is carried over into the washing apparatus and lost.

The prior methods have used relatively concentrated caustic soda solutions because dilute solutions are not effective in removing the potato skins except when long and impracticable immersion times are used. We have discovered that the failure of dilute solutions to be effective is not due to the low concentration of caustic. The real cause is the fact that sufficiently high temperatures cannot be obtained because of the low boiling point of dilute caustic solutions. We have further discovered that very effective peeling operations can be performed by dilute caustic solutions if they also contain substantial quantities of a salt dissolved therein. Thus, by adding an inexpensive salt, such as sodium chloride, to dilute caustic solutions the boiling point is increased and peeling operations become practicable. Similarly, the use of salt will enable dilute caustic solutions to achieve the same result that the prior art believed possible only when concentrated caustic solutions were used. In general, a more economical operation can be obtained by the use of our invention and when dilute caustic is used in place of concentrated solutions savings of 50 to 80 percent of the caustic consumption are not unusual.

Although any caustic solution containing dissolved salt will be useful in peeling potatoes the preferred scope of the invention is demonstrated by the accompanying drawing. The drawing shows the boiling point curves for saturated caustic soda solutions and for water solutions saturated with respect to both sodium hydroxide and sodium chloride. The zone marked A—A represents the usual operating conditions for the prior art methods while the zone marked B—B is a graphical representation of the preferred operating conditions of this invention. The most satisfactory practice of the prior art uses caustic soda of 18 to 30 percent concentration and temperatures close to the boiling point. Temperatures within three degrees of boiling are usually avoided to prevent steaming and foaming which may become dangerous to personnel. Temperatures above 220° F. are usually required to assure a short immersion time and an efficient operation.

The method of my invention uses operating conditions diagrammatically represented by the area B—B. Caustic concentrations of five to 20 percent remove potato skins effectively within the same temperature range used by the prior art. Concentrations of less than five percent caustic soda can be used but longer immersions may then be necessary.

Tests were made to determine the caustic consumption for both the prior art method and the method of the invention. Actual operating conditions were simulated in the laboratory. Batches of potatoes were treated with various caustic solutions, removed from the solution, and rinsed into appropriate vessels where the excess caustic soda carried over from the bath was measured by titrating with standard hydrochloric acid. The caustic soda actually used to remove the skins was presumed to be the difference between the total consumption and the carry over determined by the analysis of the rinse-water. Using a price of $1.95 per 100 pounds of 50 percent caustic soda solution and a price of $9 per ton for sodium chloride the cost of material was determined for each of several bath compositions as follows:

| Composition of solution | | Consumption lbs. per 100 lbs. potatoes | | | | | | | Cost, cents |
|---|---|---|---|---|---|---|---|---|---|
| | | Actual | | Carry over | | Total | | | |
| NaOH | NaCl | NaOH | NaCl | NaOH | NaCl | NaOH | NaCl | | |
| 30 | 0 | 1.11 | 0 | 1.12 | 0 | 2.23 | 0 | | 4.35 |
| 25 | 0 | 0.89 | 0 | 0.96 | 0 | 1.85 | 0 | | 3.61 |
| 10 | 15 | 0.46 | 0.2 | 0.40 | 0.51 | 0.86 | 0.71 | | 2.00 |
| 5 | 20 | 0.28 | 0.2 | 0.19 | 0.64 | 0.47 | 0.84 | | 1.30 |

The invention is preferably practiced in a continuous system in which the previously washed and drained potatoes are fed continuously into the immersion tank and propelled through the tank by means of a suitable rake or conveyor. The bath temperature should be so regulated that the potato will be adequately treated when it reaches the end of the bath and is removed by means of the conveyor or other suitable lifting device. The excess caustic should be removed from the potatoes by draining. The drained potatoes may then be washed vigorously with streams of cold water or tumbled in a continuous rotary washer. The immersion technique and the subsequent treatments are conventional and are well understood by the art.

Although the invention may be practiced with any concentration of salt it is preferred to use a solution which is saturated since the maximum temperature elevation effect is thereby obtained as well as the minimum caustic consumption.

A solution which has a higher boiling point may be obtained by using a caustic solution containing a plurality of salts in solution. Thus, by using a solution saturated with sodium chloride and sodium chlorate or sodium phosphate a higher boiling temperature than can be obtained by the same caustic solution saturated with sodium chloride, will be observed.

Further details of the invention are set forth in the following specific examples:

*Example I*

Potatoes were immersed in a solution of 5 percent caustic soda and 25 percent sodium chloride at 225° F. for one minute. Washing with water removed all of the skin completely. The loss of weight of the potato as a result of the operation was 5 percent. During the operation 0.62 pound of caustic were consumed per 100 pounds of potatoes.

*Example II*

A solution of 10 percent caustic, 20 percent sodium chloride, and 10 percent sodium chlorate was used to treat potatoes at 235° F. A 35 second immersion produced a satisfactory skin removal with a loss of 7 percent in weight.

*Example III*

A solution of 10 percent caustic and 25 percent sodium chloride at 230° F. required 45 seconds to effect a complete removal of the skin. After washing and draining, the potatoes were found to have lost 7 percent of their weight. Approximately 0.90 pound of caustic were used per 100 pounds of potatoes.

*Example IV*

A 30 percent caustic soda was used as a control on the above examples. A 45 second immersion at 230° F. was used to effect a satisfactory skin removal. The loss of weight during the operation was 10 percent. The caustic consumption was 2.23 pounds per 100 pounds of potatoes.

Although the invention has been described with respect to specific embodiments, it is not intended that the details thereof shall be construed as limitations on the scope of the invention except as included in the following claims.

We claim:

1. A method of removing the skins from potatoes which comprises immersing the potatoes in an aqueous solution of caustic soda and sodium chloride at a temperature in excess of 220° F., said solution containing 5 to 10 percent caustic soda and more than 15 percent sodium chloride.

2. A method of removing the skins from potatoes which comprises immersing the potatoes in an aqueous solution of caustic soda and sodium chloride at a temperature in excess of 220° F., said solution containing 5 to 10 percent caustic soda and sufficient sodium chloride to elevate the boiling point at least to 225° F.

RALPH W. MILLER.
OSCEOLA W. ANDREWS.